(12) United States Patent
Egelhaaf

(10) Patent No.: US 7,382,240 B2
(45) Date of Patent: Jun. 3, 2008

(54) WARNING DEVICE IN A VEHICLE

(75) Inventor: Jan Egelhaaf, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 358 days.

(21) Appl. No.: 11/155,448

(22) Filed: Jun. 16, 2005

(65) Prior Publication Data

US 2006/0044119 A1  Mar. 2, 2006

(30) Foreign Application Priority Data

Aug. 26, 2004  (DE) .................... 10 2004 041 239

(51) Int. Cl.
*B60Q 1/00* (2006.01)
(52) U.S. Cl. .................. 340/461; 340/514; 345/530
(58) Field of Classification Search ................ 340/461, 340/425.5, 514, 438; 345/530
See application file for complete search history.

(56) References Cited

U.S. PATENT DOCUMENTS

| 6,599,243 B2* | 7/2003 | Woltermann et al. ....... 600/300 |
| 2002/0008718 A1* | 1/2002 | Obradovich ................. 345/764 |
| 2003/0128123 A1* | 7/2003 | Sumiya et al. ........... 340/573.1 |

FOREIGN PATENT DOCUMENTS

| JP | 2002011925 | 1/2002 |
| JP | 2003291689 | 10/2003 |

* cited by examiner

*Primary Examiner*—Phung T Nguyen
(74) *Attorney, Agent, or Firm*—Kenyon & Kenyon LLP

(57) ABSTRACT

A warning device in a vehicle includes at least one output unit for outputting at least one warning. A training mode for calling up warnings may be started via an input unit, in which the warnings are output following a call-up without a situation, for which a warning should be output, actually having to exist. Due to this fact, the driver may intuitively inform him/herself about the warning outputs.

13 Claims, 2 Drawing Sheets

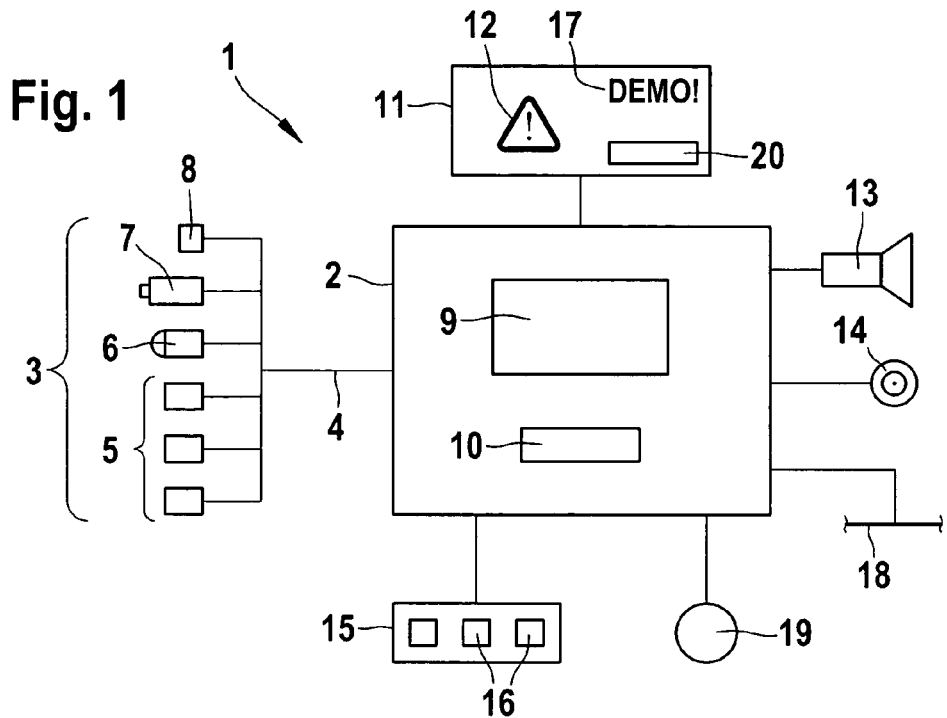
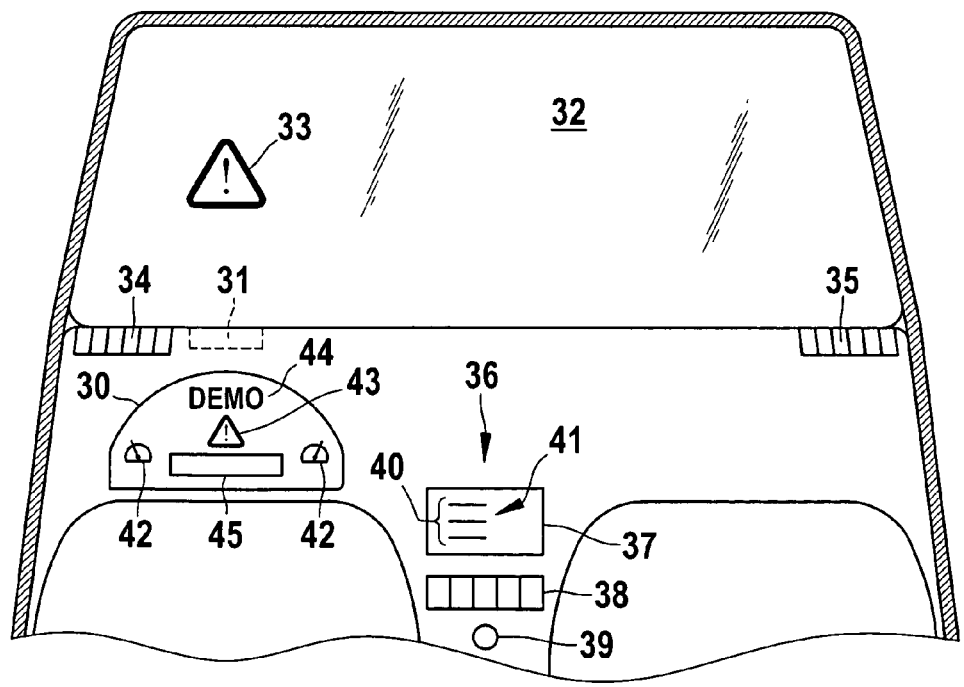

WARNING DEVICE IN A VEHICLE

BACKGROUND INFORMATION

Driver assist systems are known which support the driver in monitoring his/her driving and warn of danger situations in particular. A lane departure warning system is known, for example, which alerts the driver acoustically and/or visually about an unintentional departure from the lane traveled by the vehicle in order to avoid accidents due to inattentiveness or due to the driver experiencing a microsleep. The driving lane is detected via a video camera, for example, and the image is analyzed. A divergence from the driving lane is determined by comparing detected image data of the driving lane and the vehicle position. Moreover, a cruise control system in the vehicle is known in which a driver is acoustically and/or visually alerted when the maximum deceleration of his/her vehicle no longer suffices to maintain the distance to a vehicle traveling ahead. The driver may then regulate the vehicle's speed in such a way that he/she again has a sufficient safety distance to the vehicle traveling ahead. Moreover, the driver may also be alerted by a suitable driver assist system about obstacles which he/she approaches too closely while driving, during a parking maneuver in particular. For this purpose, distance sensors are situated on the vehicle which measure the distance to the obstacles and, in the event the distance drops below a predefined value, output a warning to the driver. The manual, which was delivered together with the vehicle, provides the driver with information about the function of the individual driver assist systems and the output of the corresponding warnings. The warnings are generally described there using text or—insofar as visual outputs of warnings are concerned—are generally represented as a photo or drawing.

SUMMARY OF THE INVENTION

The warning device according to the present invention has the advantage over the related art that the user of a vehicle is able to learn the warnings in a training mode. He/she may call up the output of the individual warnings without a concrete, critical driving situation having to exist for these warnings. Due to the fact that the driver may test and experience the warnings output by the warning device in safe surroundings, he/she may be able to respond faster, more precisely, and thus better in a critical situation when he/she must actually respond to such a warning. Due to the fact that the warnings are actually output, the driver is able to experience the warnings much more intensively and realistically compared to a mere description in an operating manual. In addition, the opportunity to call up and output warnings has the advantage that the warning functionalities may be not only explained but also demonstrated to a potential purchaser of the vehicle at the dealership. Otherwise, a demonstration of the capabilities of the driver assist system would only be possible if a critical driving situation is actually initiated. This, however, should not be done intentionally. However, as a result of the output of warnings according to the present invention, the potential purchaser may receive an impression of the vehicle's functionalities. The training mode for calling up warnings may be started via an input unit in such a way that the warnings are output after being called up, without a situation for which a warning is to be output actually occurring.

It is advantageous to provide a display which indicates to the driver that he/she is in a training mode, making it possible to immediately differentiate between an actual warning due to a vehicle situation and a warning output in the training mode. It is also advantageous to indicate to the driver, at least in the training mode, which particular warning is being output. This makes it easier for the driver to learn the corresponding warnings.

The training mode may be called up particularly easily if the input unit has a button for immediately calling up the training mode.

In order to ensure the driver is not distracted from driving by the training mode, it is advantageous to provide a deactivation unit which only allows the warning device to be operated when the vehicle's engine is stopped. Operation while driving is thus impossible. A computing unit of the warning device preferably carries out the deactivation.

Moreover, it is advantageous to store data on vehicle situations in a memory unit so that warnings are output which correspond to the particular vehicle situation. The instantaneous vehicle situation is preferably indicated to the driver. This also simplifies the learning process since the driver not only notices the warning abstractly and possibly a designation of the warning, but he/she may also be informed of a concrete vehicle situation in which this warning is output.

A warning is preferably selected via a selection from a menu, if needed also via a selection and a subsequent confirmation. In a further or alternative mode of operation, different warnings may be output in a set sequence after being called up, so that a part of the warning program or even all warnings may be demonstrated to the driver without the driver having to make an appropriate selection.

Using a warning device according to the present invention or a warning method according to the present invention is particularly advantageous for driver assist systems which warn of dangers in the vehicle's surroundings. There is now a wide range of systems available, such as the lane departure warning, the distance measurement to the vehicle side, or the distance measurement to the front. However, a driver must be able to properly respond to the different systems according to the warning output by the particular system. This may only be managed if he/she knows which driver assist system is outputting a warning. The training mode, however, makes it possible for the driver to easily learn the assignments.

BRIEF DESCRIPTION OF THE DRAWINGS

FIG. 1 shows a schematic configuration of a warning device according to the present invention.

FIG. 2 shows a warning device according to the present invention situated in a motor vehicle.

DETAILED DESCRIPTION

Figure 3:
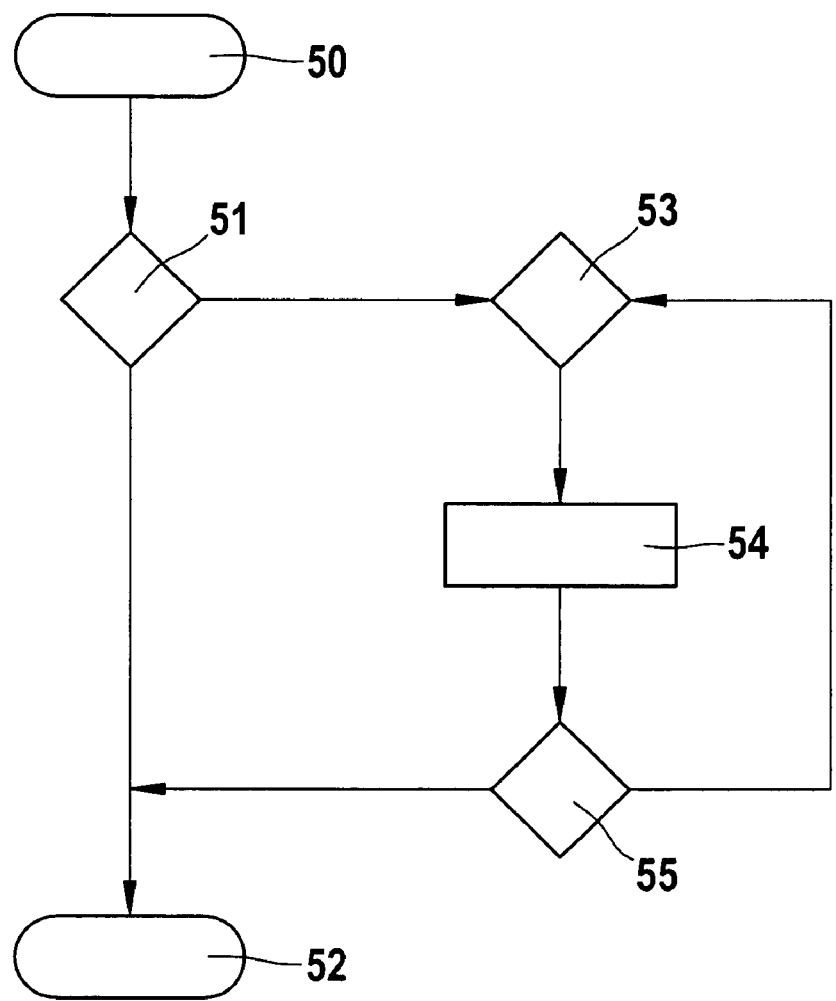
FIG. 3 shows a method according to the present invention for outputting warnings in a vehicle.

The warning device according to the present invention may be used for any vehicle. It is particularly advantageously usable in motor vehicles since a user must sometimes also operate an unfamiliar vehicle, e.g., when driving a rental car. In addition, when purchasing a new vehicle, this shortens the learning period before the user is able to effectively utilize the available support systems, in critical situations in particular. The present invention is therefore explained below based on the example of use in a motor vehicle.

FIG. 1 shows a warning device 1 according to the present invention. A central processing unit 2 analyzes data which is transmitted from sensor and analyzing units 3 to the central processing unit via a data bus 4. The sensors are, for example, ultrasonic distance sensors 5, at least one radar sensor 6, a camera 7, as well as a wheel speed sensor 8. Any other sensors may be added or replace the sensors shown. Central processing unit 2 has a computing unit 9 which analyzes the transmitted data. Limiting values for the transmitted data are stored in a memory unit 10. If the limiting values are exceeded or—depending on the type of data, e.g., distance values,—fall short, computing unit 9 triggers the output of a warning. A warning may take place, for example, visually by indicating a warning symbol via a display 11, via a display of text data, or via other visual outputs such as the flashing on and off of an otherwise continuous display. Moreover, warnings may also be output acoustically in the form of sound or text via at least one loudspeaker 13. A loudspeaker of a car radio in the vehicle is preferably used for the acoustic output. In addition, a haptic sensor, e.g., a vibration sensor in the driver seat, may also be triggered which causes the driver seat to vibrate when a corresponding warning is output.

Central processing unit 2 is additionally connected to an input unit 15 which controls the warning device. If needed, some warnings may be deactivated, the parameters may be modified, and the warning device itself may be activated using the input unit. Moreover, input unit 15 has a button 16 with which a training mode of the warning device may be switched on. In the training mode, computing unit 9 is prompted to output warnings via display 11, loudspeaker 13 and/or haptic sensor 14. The warnings are output here after at least one request by the driver without the existence or detection of a vehicle situation for which the warning is output during normal operation of the warning device outside the training mode.

If the training mode is activated, a message about the activation of the training mode is output on display 11 in a preferred embodiment. Message text 17, e.g., in the text form "Demo," may be displayed. In a first embodiment, the warnings to be output may be selected via input unit 15. For this purpose, the warnings are displayed in a menu on display 11 so that the user may select individual warnings using input unit 15. If a warning is selected, the corresponding warning is then output for a predefined period of time, for three seconds for example; a warning symbol 12 is displayed for example. If no other warning is selected, the training mode is automatically quit after a predefined time, one minute for example. Moreover, the training mode may also be deactivated via input unit 15, preferably by pressing button 16 again. In a further embodiment, central processing unit 2 may also access a vehicle data bus 18, via which it is determined when the motor vehicle's engine is started. If the engine is activated, the training mode is quit automatically.

In another embodiment, different warnings may also be automatically output after the training mode is switched on. For this purpose, a program, according to which warnings are output sequentially, is stored either in memory unit 10 or in an additional memory unit 19 which is connectable to central processing unit 2. Therefore, the driver does not need to select an individual warning, but is rather sequentially informed about preferably all warning states to be output.

In order to facilitate the driver's orientation with respect to the warning he/she is instantaneously receiving, a display field 20 is preferably provided on the display in which the warning that is instantaneously being output is displayed, preferably in text form. This makes it possible to directly assign the warning and the content of the warning. In order not to irritate the driver when an actual warning is required due to the particular vehicle situation, the output of this explanation as to which warning is being output may be restricted to the training mode.

FIG. 2 shows a representation of a dashboard and a windshield in a vehicle, a warning device according to the present invention being integrated into the dashboard. In the present embodiment, display 11 is implemented in the form of three different displays. These displays may be provided in the vehicle either together, but also in a combination with one another, or each individually. An instrument cluster 30 is situated in front of the driver. A projection unit 31 projects light onto windshield 32 so that a virtual image, here warning symbol 33, becomes visible to the driver. A first segment display 34 is situated on the left vehicle side and a second segment display 35 is situated on the right vehicle side. In addition, a display 37, in particular in the form of a liquid crystal display, is provided in the area of a center console 36. An input unit 38 in the form of pushbuttons is provided below display 37 in center console 36. In a particular embodiment, a rotary pushbutton 39 may additionally be provided instead, with which menu items may be preselected by turning and selected by pushing. Menu items 40 are shown on display 37 and may be selected by moving a display marker 41. The operating menu preferably has submenus so that a start of the training mode may also be selected in a menu or submenu.

If the training mode is activated, the driver may prompt the warning device to demonstrate an output of warnings. The selection takes place, for example, via buttons or via a suitable menu. The selection may be sorted by vehicle situations (e.g., too close, icy roadway, etc.) or by assist systems (e.g., lane departure warning, distance sensor, etc.). After the selection, warnings are output in instrument cluster 30, on display 37 in the center console, in segment displays 34, 35 and/or in the head-up display via projection unit 31. In addition to the visual displays, acoustic warnings may also be output via the loudspeaker (not shown in FIG. 2) in the form of audio warnings or spoken text. Additional displays 42, which are independent of the warning, e.g., a speed indicator, may also be provided in instrument cluster 30. The warning is displayed in the form of a symbol 43, for example. It is preferably pointed out via an overlay 44 that the warning device is in a training mode. The type of warning is displayed in a display field 45. In an additional embodiment, this message may also occur via an acoustic announcement: "The warning device has been switched into a training mode." In a further embodiment (not represented here), input elements may also be situated on the vehicle's steering wheel, so that activation and/or control of the activation mode may take place via these operating elements.

In a first embodiment, the driver may choose among the possible warnings from a list. In a further preferred embodiment, the warnings are assigned to the individual driver assist systems. If a new driver assist system is installed in the vehicle, the particular warnings may be supplemented. In a further embodiment, driving situations that are associated with the warning instantaneously being output may be displayed to the driver in the form of images or films supplementary to the warnings, on display 37 in center console 36, for example. The driver is thus able to realize the driving state in which the vehicle would be at the time the warning is output, so that he/she is able to better understand the corresponding warning intuitively.

A method for operating a warning device according to the present invention is subsequently explained on the basis of FIG. 3. The training mode of the warning device is initially activated in an activation step 50. Activation of the training mode may be made dependent on the fact that at least the ignition of the vehicle is activated, or that power consumers such as radio, instrument cluster, and light are connected to "terminal 15" (switched "plus" downstream from the battery) and activatable. If the training mode is switched on, it is checked in a first test step 51 whether the vehicle engine has been activated. If this is the case, the training mode is immediately exited again in an end step. If necessary, it is indicated in a suitable way, acoustically for example, that the training mode cannot be activated when the engine is running. If the engine is not activated, the system branches to an inquiry step 53 in which it is inquired, via a menu controller, for example, to which information the driver wants to have warnings output. It may be output, for example: "Select the driver assist system whose warning output you want to test: 1. Park Pilot, 2. ACC (adaptive cruise control), 3. LDW (lane departure warning)." Once the driver has chosen one of the driver assist systems, the system branches further to a warning output 54. On a display of the vehicle, e.g., in instrument cluster 30, the following text is displayed, for example: "In the event that the vehicle threatens to depart from the driving lane, the following warning messages shall be issued." The acoustic, visual and/or haptic alerts, which are activated in the event of a lane departure warning, are subsequently output to the driver if information on the warning is output acoustically. If information on the warning is displayed, the warning may then even occur during the display of this information. If the driver preselects the ACC system, the information appears on a display: "In the event of a take-over request (the deceleration action of the ACC is not sufficient for braking in a timely manner vis-à-vis the vehicle traveling ahead) the following warnings would be output." Warning symbol 43 is displayed in the instrument cluster in this case, for example. In addition, an audio warning is output via the loudspeaker(s) 13.

The system subsequently branches to a third test step 55 in which it is inquired whether the training mode should be continued or ended. If the driver wants information about other functions of one or multiple driver assist systems, the system branches back to a second test step 53 and the driver may carry out a new selection. If the driver does not wish to continue or, in a preferred embodiment, does not input a new request for a predefined period of time, one minute for example, the system branches from third test step 55 to end step 52.

Corresponding warnings could be output on request for the following vehicle systems, for example:

ACC (Adaptive Cruise Control)

In the event the vehicle traveling ahead is approached too closely, the following alerts are prompted: Overlay of a warning symbol onto the windshield, activation of an audio warning, overlay of a warning symbol into the instrument cluster. If necessary, symbols, corresponding to a distance, may be shown on the display. For detecting the obstacles ahead of the vehicle, radar sensors on the vehicle front side are used in particular.

BSD (Blind Spot Detection)

Sensors on the vehicle side are used in particular for this purpose. If there is a vehicle in the blind spot, a haptic alert, in particular, and/or acoustic alerts in the form of a clearly audible audio warning is/are output.

LCA (Lane Change Aid)

A camera monitors the adjoining driving lane. An alert is output when an obstacle is present on the driving lane. Here also, a haptic alert in particular and/or a visual alert is/are output.

LDW (Lane Departure Warning) and LKS (Lane Keeping Support)

An alert is output prior to a lane departure or while not keeping to the driving lane sufficiently. This alert may be initially only visual; it may, however, also be acoustic and/or haptic in the event of an increased divergence.

Park Pilot

An acoustic alert in particular is output in this case. In particular, segment displays 34, 35 below windshield 32 are actuated in the event that an object is approached too closely on the left and/or right vehicle side(s).

PSD (Parking Space Detection)

A driver is directed to suitable parking spaces, preferably via suitable displays in the instrument cluster, thereby already obtaining information about the position and/or size of the parking space. In this connection, the driver may also receive outputs regarding a semiautomatic parking method. The term warning is to be understood in this case that not only a danger warning, but also an indication of a parking space is output. The driver is alerted before passing a parking space suitable for parking his/her vehicle.

The assignment of the individual warnings to the driver assist systems may be carried out individually. Due to the output in the training mode, the driver is able to intuitively understand the particular information to be comprehended and, in the event of actual use, to assign it to the appropriate driver assist system or the vehicle surrounding monitoring system, so that he/she is able to derive the right conclusions and actions from the warnings.

What is claimed is:

1. A warning device in a vehicle comprising:
   at least one output unit for outputting at least one warning;
   at least one input unit for calling up a training mode and for calling up warnings in the training mode,
   wherein the warnings are output following a call-up; and
   a deactivation unit which allows operation of the warning device in the training mode only when a drive unit of the vehicle is shut off.

2. The warning device according to claim 1, further comprising a display for displaying the training mode of the warning device.

3. The warning device according to claim 1, further comprising a display for displaying at least one of a driving situation and a danger situation to which an instantaneously output warning refers.

4. The warning device according to claim 1, wherein the input unit has a button for calling up the training mode.

5. The warning device according to claim 1, further comprising a memory unit for storing vehicle situations for output in the training mode, warnings being output corresponding to an appropriate vehicle situation.

6. The warning device according to claim 1, wherein the warning device is part of a vehicle surrounding warning system in the vehicle.

7. A method for outputting warnings in a vehicle, the method composing:
   receiving an instruction for calling up a training mode for outputting warnings;
   receiving a selection of warnings to be output in the training mode; and
   outputting the selected warnings in the training mode following the calling up;
   wherein the training mode is operational conditional upon that a drive unit of the vehicle is shut off.

8. The method according to claim 7, further comprising calling-up a warning to be output in the training mode from a menu.

9. The method according to claim 7, further comprising outputting a stored sequence of warnings in the training mode.

10. The method according to claim 7, wherein the method is performed in a vehicle surrounding warning system in the vehicle.

11. The method according to claim 7, wherein the outputting the selected warnings in the training mode following the calling up is performed independently from a vehicle situation underlying each particular warning.

12. The method according to claim 7, further comprising displaying the training mode of the warning device.

13. The method according to claim 7, further comprising displaying at least one of a driving situation and a danger situation to which an instantaneously output warning refers.

* * * * *